Sept. 18, 1951 F. H. GRAHAM 2,568,150

BALANCING NETWORK FOR SUBSCRIBER'S TELEPHONE SETS

Filed June 15, 1948 6 Sheets-Sheet 1

INVENTOR
F. H. GRAHAM
BY
John E. Cassidy
ATTORNEY

INVENTOR
F. H. GRAHAM
BY John E. Cassidy
ATTORNEY

Sept. 18, 1951 F. H. GRAHAM 2,568,150

BALANCING NETWORK FOR SUBSCRIBER'S TELEPHONE SETS

Filed June 15, 1948 6 Sheets-Sheet 3

INVENTOR
F. H. GRAHAM
BY John E. Cassidy
ATTORNEY

INVENTOR
F. H. GRAHAM
BY
John E. Cassidy
ATTORNEY

Sept. 18, 1951 F. H. GRAHAM 2,568,150

BALANCING NETWORK FOR SUBSCRIBER'S TELEPHONE SETS

Filed June 15, 1948 6 Sheets-Sheet 5

INVENTOR
F. H. GRAHAM

BY John E. Cassidy

ATTORNEY

Sept. 18, 1951 F. H. GRAHAM 2,568,150

BALANCING NETWORK FOR SUBSCRIBER'S TELEPHONE SETS

Filed June 15, 1948 6 Sheets-Sheet 6

INVENTOR
F. H. GRAHAM
BY John E. Cassidy
ATTORNEY

Patented Sept. 18, 1951

2,568,150

UNITED STATES PATENT OFFICE 2,568,150

BALANCING NETWORK FOR SUBSCRIBERS' TELEPHONE SETS

Frank H. Graham, Pittstown, N. J., assignor to Bell Telephone Laboratories, Incorporated, New York, N. Y., a corporation of New York Application June 15, 1948, Serial No. 33,137

6 Claims. (Cl. 179—81)

This invention relates to circuit arrangements for telephone signaling systems wherein signals may be transmitted from or received at the same telephone station.

More specifically the invention relates to, or may be embodied in, a subscriber's telephone station or substation as it is more commonly called, and more particularly to the combination of a substation and a telephone line.

The invention comprehends also a method for determining in part empirically and in part mathematically the components of an anti-sidetone network in a subscriber's telephone station circuit.

The circuit arrangements for telephone signaling systems described herein are characterized by an improved anti-sidetone circuit. The anti-sidetone circuit of the present invention has for its primary function the elimination or at least a material reduction in the energy produced in a receiver in response to the generation of voice frequency signals in the transmitter in the same substation.

Anti-sidetone circuits are well known in the art being described, for instance in patents such as 1,254,474, G. A. Campbell, June 22, 1918, and 2,387,269, K. S. Johnson, October 23, 1945.

As developed at length in the Campbell patent, mentioned in the foregoing, telephone substations of the type disclosed therein comprise a transmitter, a receiver, a balancing network, consisting in the simplest form of an auxiliary resistance, and a transformer having a plurality of windings which in combination with a telephone line are so designed that: (1) the transmitter and the receiver shall be conjugate, that is, there shall be negligible sidetone in the receiver in consequence of the actuation of the transmitter by sound wave; (2) the line and the auxiliary resistance shall be conjugate in order that a negligible amount of the energy absorbed by the substation from the line shall be wasted in the auxiliary resistance; (3) for a given line having a definite impedance, the telephonic energy delivered by the transmitter shall be a maximum; (4) the amount of energy delivered by the line to the substation shall be a maximum, that is, the impedance of the substation as seen from the line shall be numerically equal to the impedance of the line and (5) that at a small sacrifice in efficiency it shall be possible to discriminate effectively against disturbing line noise as distinguished from the telephone signal received from a connected communicating station.

In the substation of the aforementioned Campbell patent there are provided a transmitter, receiver, auxiliary resistance and transformer the constants of which elements are so proportioned in accordance with formulae derived in the patent that all of the foregoing objectives are theoretically attained. However the attainment of the objectives depends upon the imposition of certain requirements on the apparatus elements. Among these requirements as stated in Patent 1,254,474 are: the biconjugacy of the transmitter and receiver and of the line and the balancing network; the transformer is required to be of very high impedance and very closely coupled, which conditions are only approximately satisfied; the resistances of the two windings of the transformer are required to be negligibly small; if a condenser is employed its reactance is required to be very small to currents of telephonic frequency or its reactance is required to be substantially neutralized by the inductance of the transformer windings. If a condenser of very small reactance at telephonic frequencies is employed, it must necessarily be quite large and therefore relatively expensive.

There is a more important consideration however which limits the utility of an anti-sidetone circuit such as described in Patent 1,254,474, mentioned in the foregoing, and that is the requirement that the impedance of the required balancing network depends upon the impedance of the circuits interconnecting the substations. As is generally well understood the lengths of lines interconnecting subscribers' stations to central stations differ widely. Further substations on a large percentage of calls are interconnected through trunk circuits between central stations which central stations are separated by different distances depending upon their relative locations. The gauges of the interconnecting conductors as well as their lengths vary. The cord circuits employed in the different central stations vary. In short, except in a few kinds of service, such as in a private branch exchange, where the lengths and impedances of the interconnecting facilities can be made substantially uniform, the impedances of the facilities interconnecting two substations vary widely, and consequently it is not possible to effectively eliminate sidetone by a method which depends upon a fixed line impedance.

The present invention has for an object the elimination, or substantial reduction, of sidetone in a telephone receiver in subscriber sets which may be interconnected through subscriber lines, trunks and switching facilities of differing impedances.

In the method of determining the components of an anti-sidetone network for subscriber station sets in accordance with the present invention, a pair of subscriber stations are interconnected successively through a considerable number of facilities representative as to gauges, lengths, and impedances of the various interconnections in the telephone switching system in which the sets are to be employed. The substation circuits are equipped with transmission equalizers which tend to compensate for the varying conditions encountered. The representative interconnections include the limiting conditions, that is to say they include the shortest as well as the longest interconnections and include the smallest and largest gauges of conductors, etc.

The method of determining the component elements of the anti-sidetone balancing network comprises the combination of empirical and mathematical steps in a process to be described herein. The method involves the interconnection of two subsets successively through a sufficient number of different kinds of connections to typify the system and a determination first of the component of the ideal anti-sidetone network for each such separate connection at a sufficient number of selected single frequencies to cover the frequency range of the system. In this process a variable impedance, including resistance and reactance, is connected across the two terminals in the subset to which the anti-sidetone network is ordinarily connected. Then a tone of fixed energy and of a particular fixed frequency is impressed on the transmitter. The magnitude of the variable resistance element and of the variable reactance element in the variable impedance is changed until the return loss is infinite at which point the energy in the receiver is zero. The necessary amount of resistance and reactance to achieve this condition at the particular frequency is plotted on a system of rectangular coordinates for all of the various interconnections chosen to represent the switching system. This affords a graph of a large number of individual points each of which obviously represents the amount of resistance and reactance required for zero sidetone for each of the individual interconnections at the particular frequency.

It is known in the art that the number of decibels difference in energy in the receiver between any point on the graph and any other point on the graph is fixed by the relationship:

$$\text{Return loss (in decibels)} = 20 \log \frac{1+\dfrac{Z_L}{Z_N}}{1-\dfrac{Z_L}{Z_N}}$$

where $Z_L$ is a complex quantity, such as $23+j30$, representing the impedance indicated by the first point and $Z_N$ is a similar complex quantity representing the impedance indicated by the second point.

This expression may be written:

$$\text{Return loss} = 20 \log \frac{Z_N+Z_L}{Z_N-Z_L}$$

A point may therefore be chosen, with reference to the foregoing formula, among the infinite return loss points plotted in accordance with the foregoing, with reference to which chosen point the return loss, at the particular frequency, for the interconnecting facility, as represented by each other point on the graph, is sufficiently high that the amount of energy in the receiver does not exceed an allowable maximum. The resistance and reactance values of the chosen point then represent the resistance and reactance values of the desired network at the particular frequency.

Next the frequency applied to the transmitter is changed to a second fixed representative value within the telephone frequency range, of the substation, which is to be covered. A second plot is made and a second desirable point is selected in the same manner as described for the first, thus affording a resistance and reactance value as indicated by the position of the second point of the network required at the second frequency value.

In this manner the full operational frequency range of the subset is covered, affording the resistance and reactance values of the required network at any desired number of different frequency values throughout the range. The resistance and reactance values of the selected desirable points may then be plotted on resistance versus frequency and reactance versus frequency graphs to disclose the characteristics of a suitable anti-sidetone network. The necessary number and kind of elements and the constants of each may then be determined by rigorous mathematical analysis or by graphical methods such as that described by K. G. Van Wynen in the Bell System Technical Journal for October 1943.

In the following the foregoing procedure as applied to two telephone substations, described in U. S. patent application N. Botsford et al. Serial No. 793,170, filed December 22, 1947, interconnected at different times through a considerable number of subscriber line circuits, cord circuits and trunk circuits of different lengths and gauges representative of a large communication switching system plant, a graph was obtained showing desirable resistance and reactance values for a suitable balancing network, that is for a network which afforded energy of satisfactorily low level in the telephone receivers of the individual subsets.

This procedure may be applied to any group of connections to determine the most desirable network. The method as described consists of:

1. Determining the impedance (resistance-reactance) for infinite return loss for each connection at all frequencies of interest.

2. Determining the impedance characteristic for a network which best meets the requirement of minimum sidetone for the range of connections to be satisfied. The range of connections may be grouped such that a network would be chosen to satisfy:

(a) all possible connections which may be realized by any set in service. That is, for all lengths and gauges of connecting loops and trunks and for all types of central offices;

(b) one particular length and gauge of loop connected to one particular office but including all possible trunk and terminating station connections;

(c) intermediate groupings between limits of (a) and (b), for example to include all connecting loops which have a total conductor resistance within a specified range but including all possible types of central office, trunk and terminating station connections. Other groupings would then be chosen for other resistance ranges to include all possible loops from zero ohms to the maximum limiting resistance.

3. Determining the arrangement and size of the electrical constants of resistance, capacitance and inductance comprising the network to give the impedance versus frequency characteristic determined by the methods outlined in 1 and 2. The degree to which the sidetone is reduced is dictated by the use to which the set is to be put, the economic factors involved and the physical limitations such as size, complexity, etc. With no limitations a network can be designed so that the fit of the impedance of the network to the impedance characteristics required for maximum return loss or minimum sidetone can be made to practically any desired degree. Several methods are proposed herein for achieving this result as follows:

(a) The use of one network consisting of fixed electrical constants to satisfy all possible connections for sets in service. This type is in general more economical and does not necessitate special installation and maintenance practices.

(b) A network which has component parts which vary with frequency to attain a better impedance fit and as a consequence lower sidetone than obtainable with a network having fixed constants. For this purpose use is made of the eddy current and hysteresis losses in magnetic circuits. For example, a coil consisting of two windings either aiding or opposing on a core of magnetic material and a short circuited turn or turns may be utilized. By controlling the number of turns and the resistance of the short circuited turn the resistance and inductance may be caused to vary with frequency in a prescribed manner. A condenser having dielectric loss is another source of an electrical impedance which is dependent on frequency.

(c) The use of a network including an element depending on current which would make compensations in the network for variations in the resistance of the loop. The use of such a device provides better sidetone balance because the network would not be required to meet wide variations.

In the design of the network for the station set described herein, the equalizer consisting of a filament and thermistor in the transmitter mesh provides equalization in short loops and this has allowed the use of a network having elements with fixed constants which afford sufficiently low sidetone on all connections to permit the use of instruments with 10 decibels more gain than formerly practicable.

The invention may be understood from the following detailed description when read with reference to the associated drawings which taken together disclose a preferred embodiment of the invention. The invention is not however limited to the described embodiment but may be practiced in other forms which will readily be suggested by the following to those skilled in the art. In the drawings.

Figure 1:
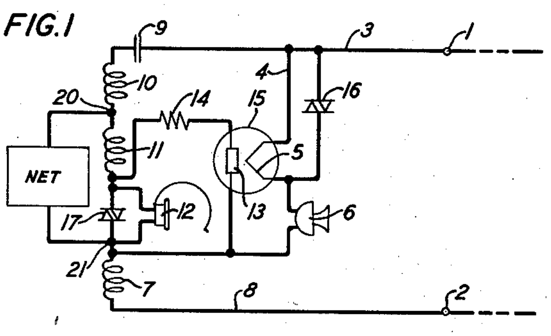
Fig. 1 is a telephone substation circuit including an anti-sidetone network which may be produced in accordance with the present invention.

Refer now to Fig. 1 which shows a particular subscriber telephone station circuit to which the method of the present invention may be applied.

The substation circuit of Fig. 1 is arranged for transmission equalization for connected loops of differing lengths. It is described in detail in the U. S. patent application of N. Botsford et al., Serial No. 793,170, filed December 22, 1947, which is incorporated herein by this reference as though fully set forth herein.

A brief description of its operation is as follows:

Terminals 1 and 2 connect to a pair of conductors extending to a manual or a mechanical central switching station where they terminate in a subscriber's line circuit by means of which the circuit may be extended through a manual cord circuit or through a mechanical switching circuit directly to another subscriber's line circuit, terminating in the same switching station, and then through conductors extending to another subscriber's station circuit.

If more than one central station is involved in a particular switching operation, the connection may extend between such central stations by means of a trunk circuit or trunk circuits in tandem.

These various connections will differ in lengths on different connections and in most telephone switching systems of any size will vary also in the gauges of the different conductors employed on different connections. There is but one central battery employed at a particular central station as a general rule. The voltage of this battery is regulated so as to be maintained within certain prescribed limits. However since the lengths and impedances of the loop conductors vary the voltages applied across the substations will vary correspondingly.

The subscriber's station set indicated in Fig. 1 includes a transmission equalizer device which compensates for the variations in the resistance of the subscriber's loops. The circuit path for the transmitter may be traced from terminal 1 through conductors 3 and 4, through a non linear resistance element 5, transmitter 6, bottom winding 7 of the telephone induction coil, and conductor 8 to terminal 2. The receiving branch may be traced from terminal 1 through conductor 3, condenser 9, top and middle windings 10 and 11 of the telephone induction coil, telephone receiver 12, bottom winding 7 of the induction coil and conductor 8 to terminal 2. The non-linear resistance element 5 has a positive coefficient of resistance so that its resistance increases as the current through it increases. As a result of this, on short loops, since the current through the transmitter would tend to be above the normal value, the resistnace of the element 5 will increase, reducing the current through the transmitter. Transmitter 6 and filament 5 constitute a low impedance mesh. While the effect of the resistance variation is to reduce the direct current through the transmitter on short loops equalization of transmission depends also to a large extent on the voice frequency loss of the filament resistance in the low impedance mesh.

Shunting the receiver 12 is a series branch including a thermistor 13 and a resistance 14. The non-linear resistance 5 is in the form of an incandescent lamp filament, which filament may be of tungsten, enclosed in an evacuated impervious container 15 and juxtaposed the thermistor 13 also mounted within the container 15. The temperature of the filament 5 increases on short loops, thus raising the temperature of juxtaposed thermistor 13. The resistance of the thermistor decreases as its temperature increases thus reducing the resistance of the shunt around receiver 12 so that a larger amount of the energy of a received signal is diverted through the shunt on short loops.

The output of the transmitter is not linear for increasing current. After a certain limiting value of current is reached its output curve flattens. For transmitter current values greater than the critical value at which transmitter output no longer increases it is undesirable to have further reduction effected by filament 5. Varistor 16, which may be of silicon carbide, shunts filament 5. Its characteristic is opposite to that of filament 5 for its resistance decreases as the current through it increases. For low current values its resistance is so high that it does not affect the transmission loss. For higher loop current the resistance of varistor 16 is materially reduced. Thus at a point beyond which further reduction in transmission, which would otherwise be effected by filament 5 acting alone, would be undesirable, the shunting varistor 16 is effective to pass more current through the transmitter and prevent excessive loss.

A varistor 17 shunts the telephone receiver. It performs two functions. The first is the well known function of reducing the effect, due to sudden voltage changes, known as clicks in the telephone receiver. In combination with thermistor 13 the varistor 17 performs a second function of protecting the thermistor. Thermistor 13 has a slow response for voltage surges through it. If a large current flows through it when in the low resistance condition it will burn out. The varistor click reducer 17, however, will respond to these fast voltage surges and assume a low resistance state which then protects the thermistor 13 by draining current away from it.

The transmitter and receiver of the circuit per Fig. 1 are mounted in an arrangement known in the art as a handset. The transmitter is an improved transmitter which is generally in accordance with that described in Patent 2,042,822 granted to A. F. Bennett and W. L. Tuffnell issued June 23, 1936, except that it is smaller and lighter and employs a stabilized carbon for the variable resistance element to reduce the customary increase in transmitter resistance with age and use and to thereby reduce the attending decrease in modulating efficiency. It is possible to work the carbon of the transmitter of Fig. 1 harder than has been the practice because of the limiting effect of filament 5 on the battery supply circuit. The variable resistance granules of the new transmitter will have a carbon surface deposited from methane gas. Alternatively, in a second arrangement, the surface may be deposited on quartz. The variable resistance chamber may be as described in Patent 2,042,822 or may be hermetically sealed to protect the carbon against contamination.

A ring armature type receiver is employed in the circuit of Fig. 1. Such receivers are described for instance in Patent 2,170,571, E. E. Mott, August 22, 1939, Patent 2,171,733, A. L. Thuras, September 5, 1939, and Patent 2,249,160, E. E. Mott, July 15, 1941.

The new handset is shorter than those presently employed in the art and is arranged so that when the receiver is held to the ear of a normal head the transmitter is disposed closer to the lips of the speaker than in presently arranged handsets.

As a result of the improvement in over-all transmission characteristics of the substation per Fig. 1 an over-all gain of about 10 decibels is effected. As a result of this it is necessary to effect a corresponding reduction in sidetone in the receiver. For reasons explained this would not be possible by the application of presently known anti-sidetone circuit design by rigorous mathematical analysis.

An important aspect of the present invention is the design of an anti-sidetone network by a combination of mathematical and empirical steps. The manner in which this is performed will now be explained.

Figure 1A:
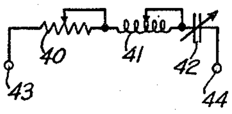
Fig. 1A shows an anti-sidetone measuring set.
Figure 4:
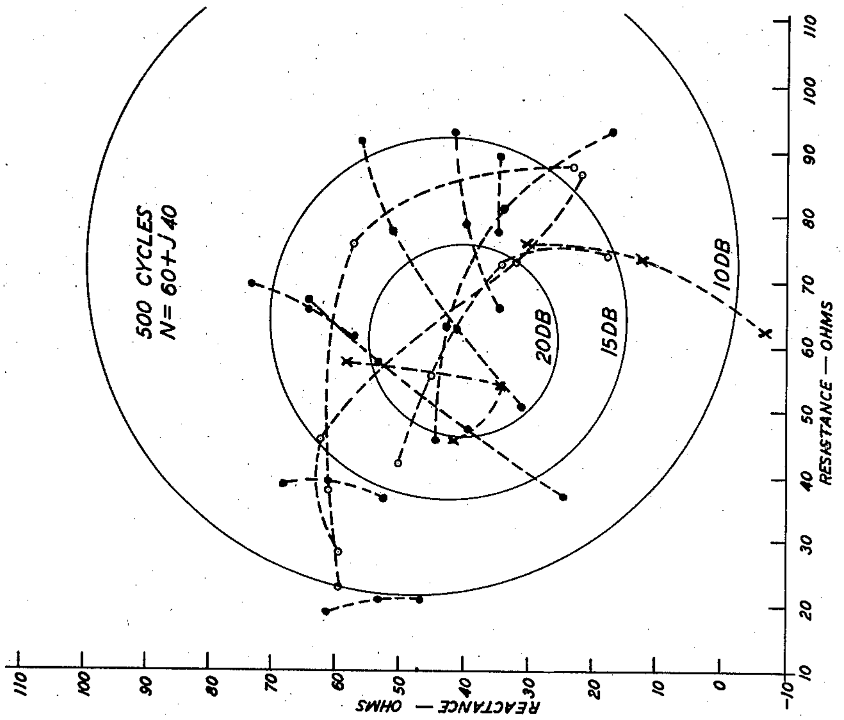

A measuring set for measuring the resistance and reactance components of a plurality of anti-sidetone networks required to produce infinite return loss in the receiver, when the subscriber set per Fig. 1 is connected in turn to a plurality of individual facilities, to typify the system in which the subscriber set per Fig. 1 is to be employed, is shown in Fig. 1A. The measuring set may take a number of different forms. It is illustrated as comprising a variable resistance 40, a variable inductance 41 and a variable capacitance 42 all connected in series between terminals 43 and 44. The variable impedance comprising variable resistance and variable reactance is connected across points 20 and 21 in the circuit. Two substations such as Fig. 1 are then interconnected successively through a sufficient number of different connecting facilities to typify the switching system in which the circuit per Fig. 1 is to function. Among these facilities as mentioned above will be subscriber's loops and trunks of the shortest and longest lengths and of the smallest and largest gauges, and all of the various kinds of cord circuits employed in the system.

Refer now to Figs. 3 to 10.

Each of these figures is a return loss graph taken at a different frequency. The abscissa in each graph represents resistance in ohms. The ordinate represents reactance in ohms.

Figures 1B, 12:
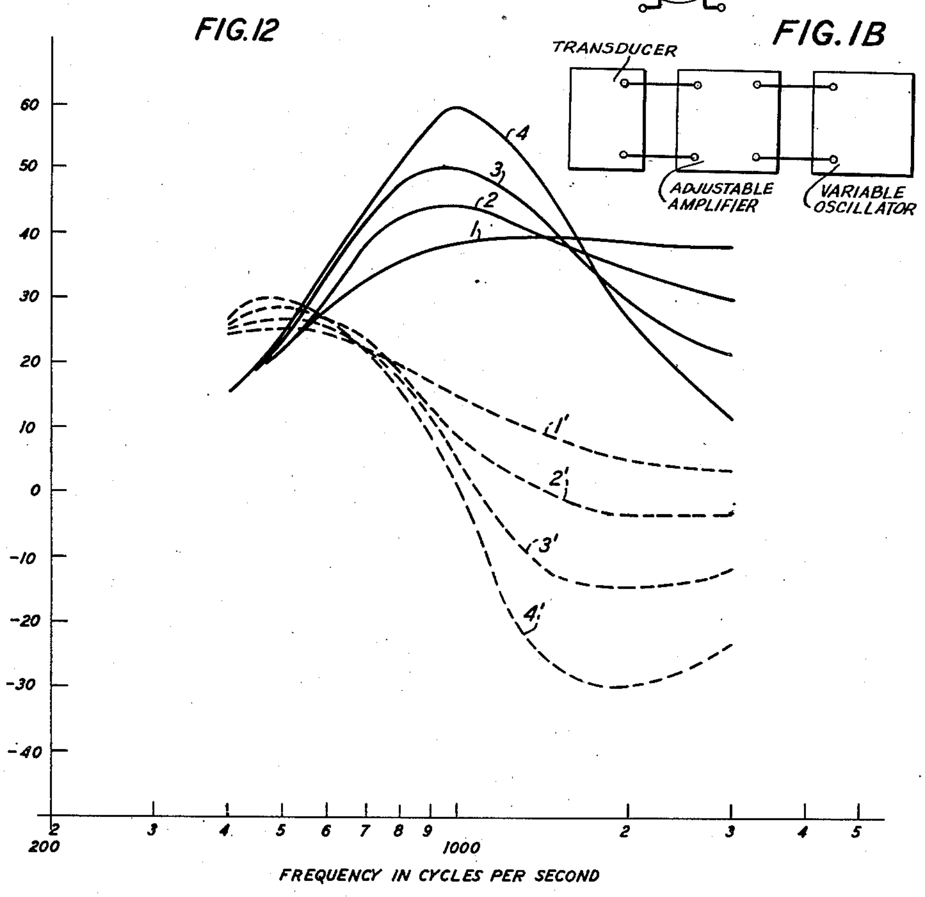
Fig. 1B shows, in block diagram form, a variable oscillator, an adjustable amplifier and a transducer, conventional apparatus units for producing tones of differing fixed frequencies and of uniform intensity.
Figs. 3 to 12 show graphs used in explaining the invention.
Figure 3:
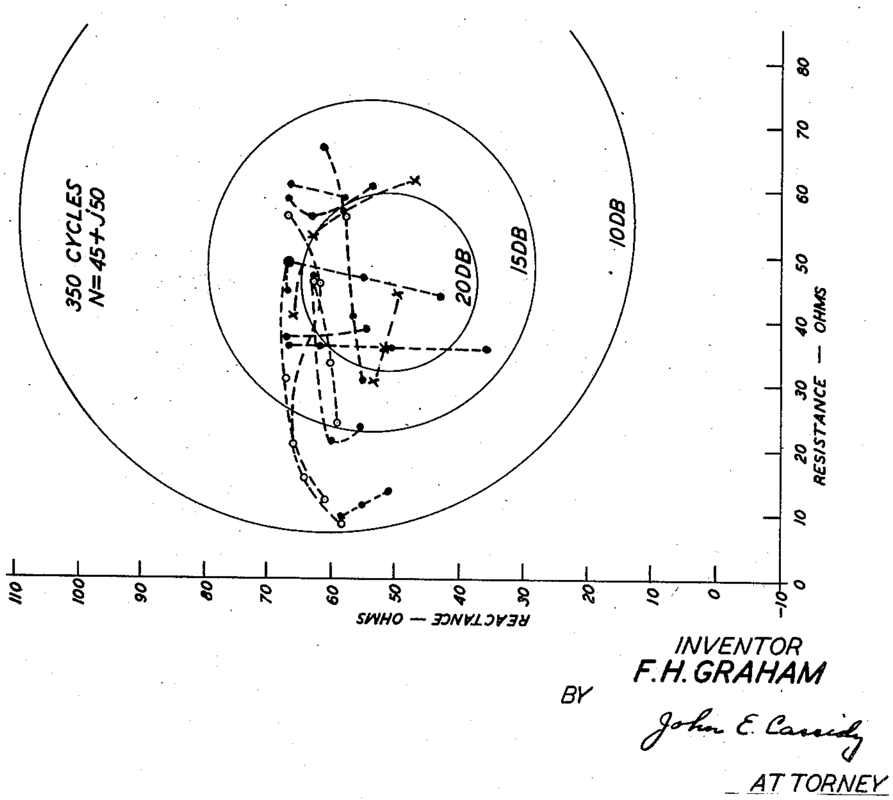
Figure 6:
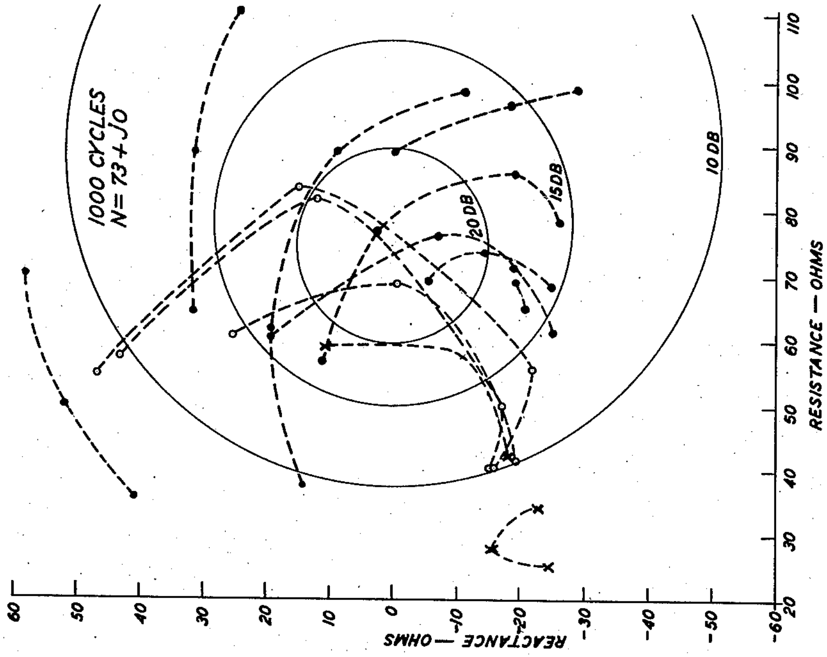
Figure 5:
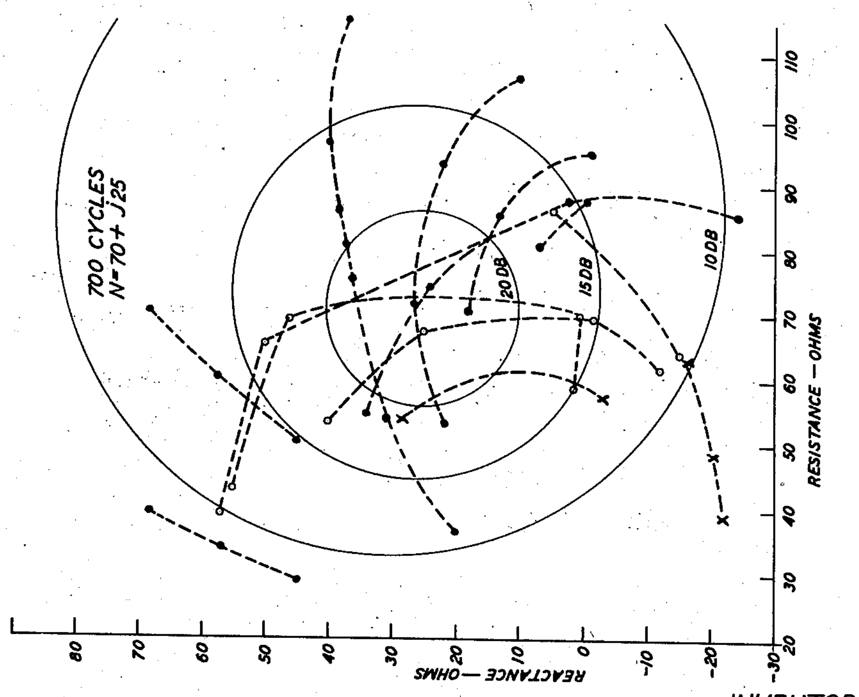
Figure 8:
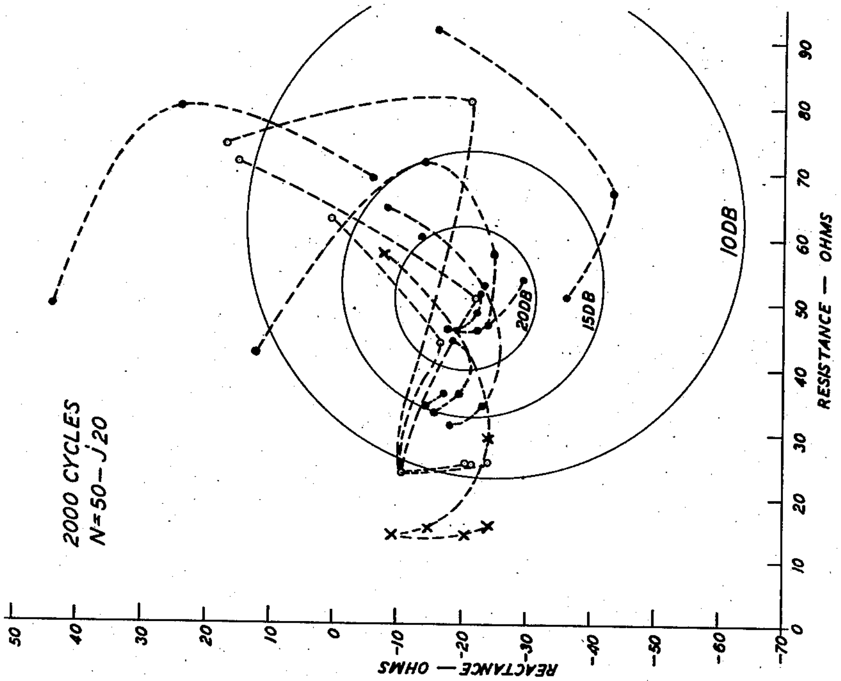
Figure 7:
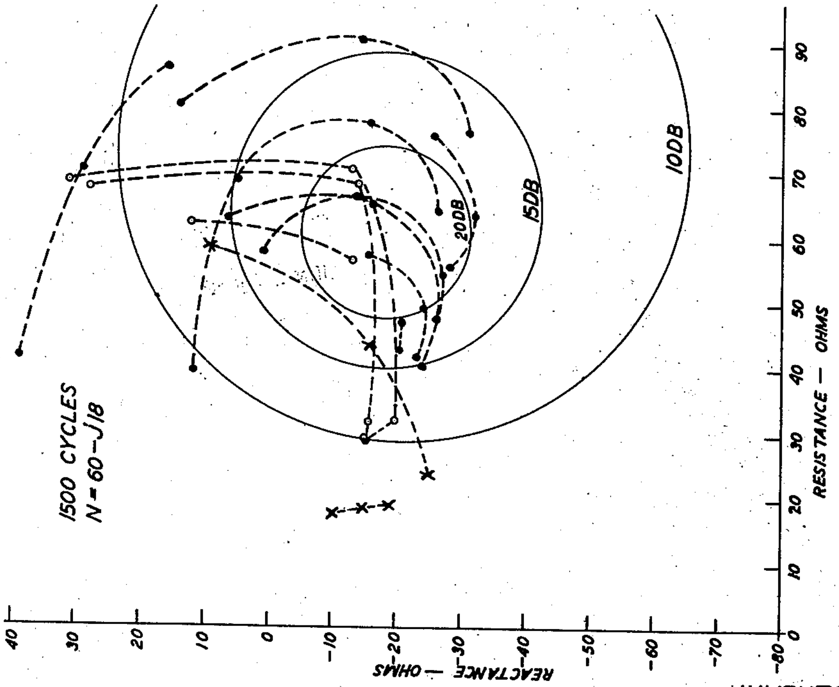
Figure 10:
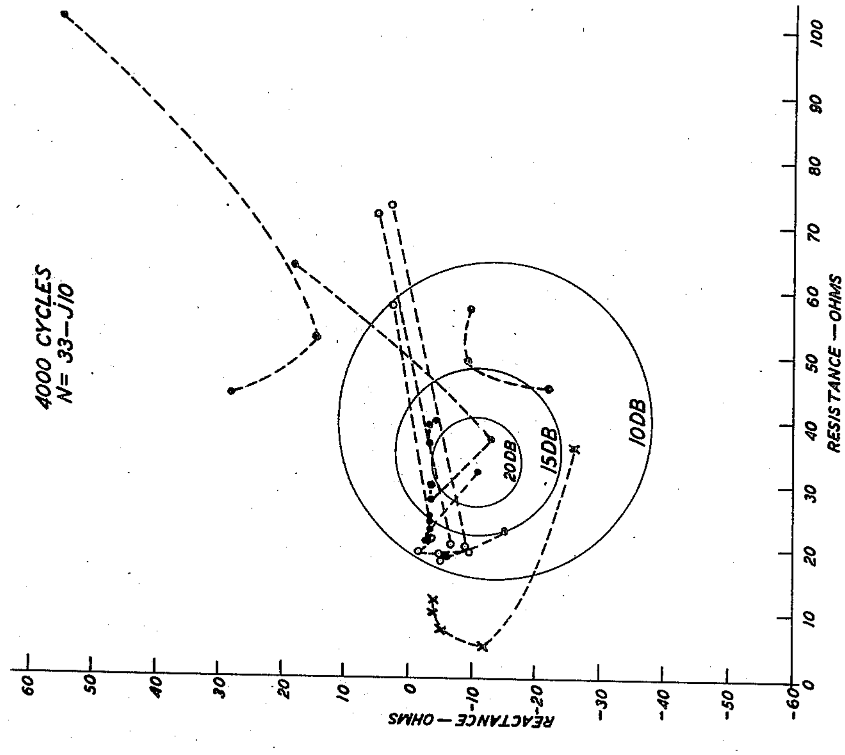
Figure 9:
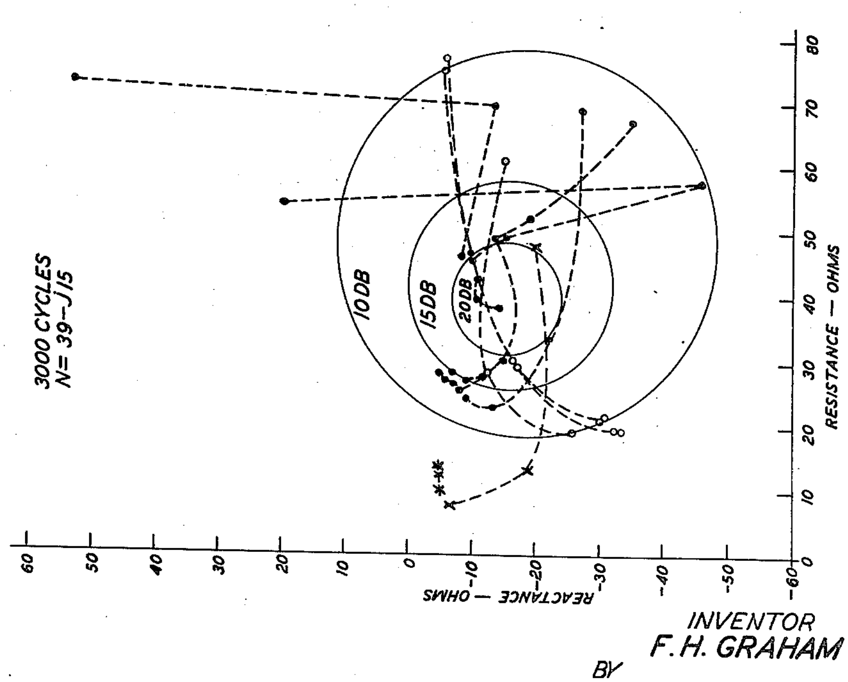

A tone of a single particular frequency and of a fixed intensity is produced, in a well known manner, by the variable oscillator, adjustable amplifier, and transducer of Fig. 1B, and is applied to the transmitter and the variable resistance and variable reactance employed for measuring purposes are adjusted for each connected facility in turn until no tone is heard in the receiver. The magnitude of the resistance and reactance necessary to produce this condition for a particular interconnecting facility at a particular frequency is represented by a single point on a particular figure. Fig. 3 for instance was made at a frequency of 350 cycles. Each point on this figure represents the amount of resistance and reactance necessary to produce infinite return loss, or zero tone in the receiver, for a different interconnection, among which interconnections are interconnections simulating all those employed in a particular switching system, particularly those representative of the limiting conditions. The broken lines shown in each of Figs. 3 to 10 are not necessary to a solution of the problem. In making measurements on a connection of a particular character such as one including a trunk circuit of a particular gauge, for instance, a point would be determined say for the longest such trunk and then successive points for such a trunk of average length and for one of shortest length. Points determined in such order would be expected to be on a continuous curve. Wide departures from a continuous smooth curve would indicate an error in the selection of the particular trunk, in the measuring of the balancing resistance and/or reactance or in the plotting. Thus the broken lines in each figure serve only as a check in the selection, measuring and plotting.

Having plotted all of the infinite return loss points for the various interconnections at a particular frequency as above described on a particular graph, such as Fig. 3, it is possible to select a desirable particular point on the graph which would represent the amount of resistance and reactance for an anti-sidetone balancing network necessary to provide infinite return loss in the receiver for some connecting facility represented by the chosen desirable point. It is particularly pointed out that the chosen desirable point need not and probably will not correspond to that of any facility which has actually been employed in the measurements.

The factors governing the selection of the desirable point will become clear hereinafter. The magnitude of the resistance and reactance of the selected point represents the magnitude of the resistance and reactance of the required balancing network at the particular frequency. The return loss at this frequency for the facility indicated by each other point on a particular graph when the balancing network has resistance and reactance for a particular frequency indicated by the magnitude of the resistance and reactance of the selected point is determinable in a manner to be described hereinafter.

To anticipate, the loci of points of uniform loss are circumferences of circles having centers along an axis extending from the zero resistance-zero reactance point of the graph through the selected point. The position of the centers of each of the circular loci and the radii of the circles which afford a given indicated loss with respect to the selected point are shown on each of Figs. 3 to 10. The circumference of the innermost circle in each instance is the loci of all points having a return loss of 20 decibels at the frequency indicated in each figure with respect to a network having the resistance and reactance of the selected point which, in the case of Fig. 3 has a resistance value of 45 and a reactance value of 50 for 350 cycles and is shown as $45+j50$ in the conventional rectangular system of impedance notation which is used as the value of N in the return loss formula in the foregoing. The selected points appear thus on each of Figs. 3 to 10. The switching facility represented by all points within the innermost circle on each figure has a loss at the indicated frequency of not less than 20 decibels when a network is employed having the value of N shown in each figure at the corresponding frequency. The circumference of the middle circle is the loci for 15 decibels loss and of the outer circle for 10 decibels loss.

Figure 11:
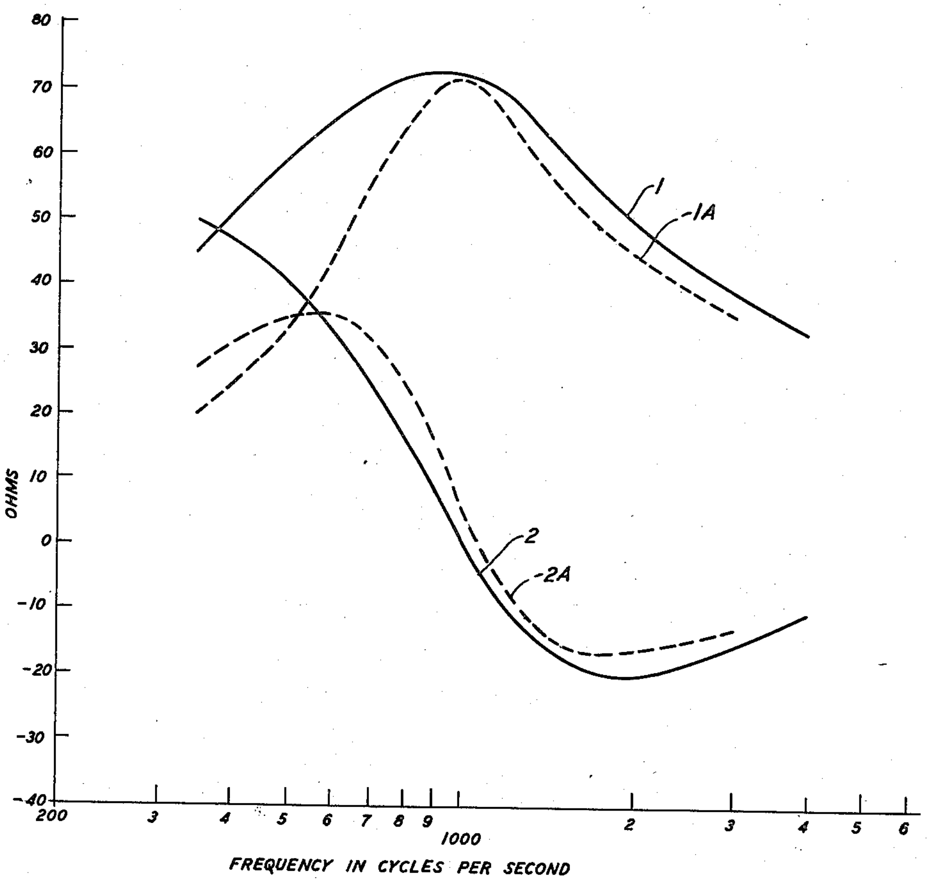

Fig. 11 shows 4 graphs numbered 1, 1A, 2 and 2A. Graph 1 shows the magnitudes of the resistance values of N of Figs. 3 to 10 plotted against the logarithm of the frequency. Graph 2 shows the same for the reactance. Fig. 1A shows the actual values of the resistance of the network which is employed plotted against frequency. Curve 2A shows the same for the reactance values of the network employed. The relationship of graphs 1A and 2A to graphs 1 and 2 in other words show the fit or approximation of what is employed for what Figs. 3 to 10 indicate is needed.

It should be obvious from the foregoing that the pattern of points in any figure such as Figs. 3 to 10 will be different for each switching system to which the method is applied. It will depend in each instance on the character of the components of the particular system. The selected point, or N, for each figure will therefore be different and the graphs such as 1 and 2 in Fig. 11 will be different for each system but the method described may be applied to any system.

The manner in which the return loss loci for particular values of loss may be determined is as follows:

First a point is selected visually on each graph with reference to the distribution of the various points on the graph and with reference to the operation of the return loss formula:

$$\text{Return loss, in decibels,} = 20 \log \frac{L+N}{L-N}$$

In this expression L is the impedance expressed in rectangular form, such as $x+iy$, where $x$ is the value of the resistance, $i$ is the imaginary quantity $\sqrt{-1}$, and $y$ is the value of the reactance of any point on the graph and N is the impedance expressed in the same form of the selected desirable point on any graph.

Following is a sample set of calculations for the return loss loci for the graph per Fig. 3. In these calculations the value of N is the impedance corresponding to the visually chosen point in Fig. 3 namely $45+j50$. Using this value in the above formula we obtain:

$$\text{Return loss (in decibels)} = 20 \log \frac{x+iy+45+j50}{x+iy-45-j50}$$

Let us assume that the return loss locus for all points representing impedances corresponding to facilities having a loss of 20 decibels with respect to the selected network impedance of $45+j50$ is to be determined. This may be found as follows:

$$20 = 20 \log \frac{x+iy+45+j50}{x+iy-45-j50}$$

$$20 = 10 \log \left|\frac{x+iy+45+j50}{x+iy-45-j50}\right|^2$$

$$2 = \log \left|\frac{x+iy+45+j50}{x+iy-45-j50}\right|^2$$

$$100 = \left|\frac{x+iy+45+j50}{x+iy-45-j50}\right|^2$$

$$100[x^2-90x+y^2-100y+4525] = x^2+90x+y^2+100y$$
$$+4525(1-100)x^2+(1+100)90x+(1-100)y^2+$$
$$(1+100)100y+4525(1-100)=0$$

$$x^2+\left(\frac{1+100}{1-100}\right)90x+y^2+\left(\frac{1+100}{1-100}\right)100y+4525=0$$

The last formula is an expression involving the square of the variable $x$, the square of the variable $y$ a constant times the first power of $x$, a constant times the first power of $y$, a numerical constant and it has no $xy$ term. The locus therefore of points having 20-decibel loss with respect to the visually chosen point, from analytic geometry, is the circumference of a circle. The center of the circle is a point which we will call $(a, b)$ in which $a$, the $x$ ordinate of the point, is ½ the coefficient of the $x$ term with sign reversed, and in which $b$, the $y$ ordinate of the point, is ½ the coefficient of the $y$ term with sign reversed.

Thus:

$$a=-\left(\frac{1+100}{1-100}\right)45=45.9$$

$$b=-\frac{1+100}{1-100}50=51.0$$

The radius of the circle is the square root of the expression $a^2+b^2$ minus the constant 4525 from the above equation, or $$r=\sqrt{a^2+b^2-4525}=\sqrt{\overline{45.9}^2+\overline{51.0}^2-4525}=13.5$$

If therefore the point $(a, b)$ or (45.9, 51.0) is plotted and a circle is drawn with this point as center and radius 13.5 its circumference will pass through all points representing impedances of facilities which when connected to a subcircuit having an impedance $45+j50$ will have 20 decibels less energy in the receiver than in the transmitter. The locus of all points having any desired loss may thus be determined for any of Figs. 3 to 10. All points within the innermost circle have losses greater than 20 decibels.

By equating:

$$\left|\frac{x+iy+45+j50}{x+iy-45-j50}\right|^2=c$$

The equation reduces to $$x^2+\left(\frac{1+c}{1-c}\right)90x+y^2+\left(\frac{1+c}{1-c}\right)100y+4525=0$$

For various representative values of decibels, as indicated, the constants are:

| db. | c | $\frac{1+c}{1-c}$ | a | b | r |
|---|---|---|---|---|---|
| 20 | 100 | −1.0202 | 45.9 | 51.0 | 13.5 |
| 15 | 31.62 | −1.0653 | 47.9 | 53.3 | 26.6 |
| 10 | 10 | −1.2222 | 55.0 | 61.1 | 48.7 |
| 5 | 3.162 | −1.925 | 86.6 | 96.3 | 110.8 |

From the above it may be seen that the radii of the equal loss circles grow larger as the loss in decibels decreases. Further from plotting the centers $(a, b)$ of the various loci it will be seen that they lie along a protracted line joining the zero resistance zero impedance point of the figure with the visually selected point.

The loci for 20, 15 and 10 decibels have been plotted in each figure. The locus for 5 decibels has not been plotted as the radius is too large for the graph in most instances. With some experience in the use of the method it is possible to select network impedance values for each representative frequency throughout the range so as to keep the energy in the receiver for most facilities, in a highly diversified system, more than 10 decibels below that in the transmitter which is more than can be achieved with any rigorously mathematically designed network applied to a diversified interconnecting switching system in which network the constants of the component elements remain fixed.

In Fig. 11, the values of resistance represented by the selected points for each of the frequencies indicated in Figs. 3 to 10 are plotted as ordinates on a numerical scale against the frequency on a logarithmic scale in curve 1. Curve 2 shows the same for the reactance. These curves considered together show the characteristics of the desired network, and of course they will differ as the components of the switching system, in the subscribers' station circuits of which the anti-sidetone network is to be applied, differ.

From this point forward the determining of the components elements of the network and the constants thereof may be carried on by methods well known in the art. This may be done by rigorous mathematical methods or a satisfactorily close approximation of the required network may be achieved by a combination of mathematical and graphical methods such as described in the K. G. Van Wynen paper mentioned above.

Figure 2:
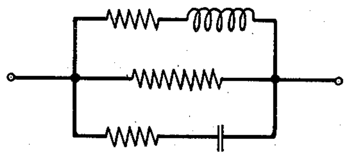
Fig. 2 shows a network having component elements having fixed constants and the disposition thereof in the anti-sidetone network of Fig. 1 when used in a particular switching system.

Either of these methods indicates a network as shown in Fig. 2. The characteristics of this network are as shown in Fig. 11, curves 1A and 2A. This gives a fair approximation as may be seen from comparison with the curves 1 and 2 of Fig. 11. A network such as Fig. 2 when used in cooperation with the transmission equalizer in Fig. 1 affords sufficient sidetone reduction for a typical system. The characteristic cannot be exactly simulated by a simple network with elements having fixed linear characteristics. The magnitude of the positive reactance required at low frequencies is greater than that of the negative reactance required at the higher frequencies and the resistance versus frequency characteristic is not symmetrical. Closer approximation to the required curve is obtained by making the network dependent on other factors.

Figure 13:
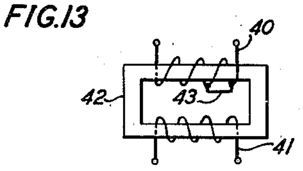
Fig. 13 shows a means of obtaining a frequency dependent resistance.

Refer now to Fig. 13 which shows a method of obtaining a frequency dependent resistance. This consists in one or two series aiding or series opposing current conducting coils 40 and 41 wound on a magnetic core 42. A turn or a number of turns of one of the windings may be short circuited as by conductor 43. The effect of the eddy current and hysteresis losses vary with frequency and produce a corresponding change in the resistance between the terminals of the windings. This element can be introduced into a network mesh to produce the desired modification.

Figure 2A:
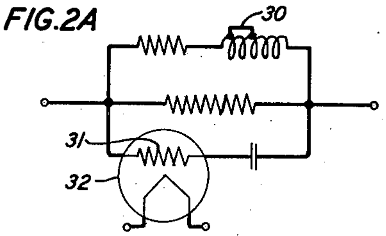
Fig. 2A is a second embodiment of Fig. 2 in which certain of the elements have varying constants.

Refer to Figs. 2A and 12.

Fig. 12 shows the general form of the resistance and reactance required in the network for minimum sidetone for a subscriber station set connected to loops having total resistance values varying from those of minimum to maximum value employed in a typical system. The upper curves numbered 1 to 4 show the resistance values required in the network for increasing loop resistance. Curves 1' to 4' are the corresponding network reactance values required. These curves suggest the desirability of a network arranged as in Fig. 2A which would be used as the network in Fig. 1. A non-linear heat responsive resistance element such as resistance 31, which is in series with a condenser in one of the network branches, is coupled with the filament of a ballast lamp 32 in series with the loop. For this purpose a separate ballast lamp, or the ballast lamp shown in Fig. 1 may be employed in which case resistance 31 may be included in the same envelope with thermistor 13.

What is claimed is:

1. In combination in a telephone system, a subscriber's telephone station circuit connected to a loop, a transmitter connected across said loop, a transmission equalizer connected in series with said transmitter, said equalizer compensating for varying current conditions for differing loop conditions, a receiver in said circuit connected in parallel with said transmitter, an anti-sidetone balancing network connected in shunt with said receiver, a lumped impedance in said network, an element in said circuit, in series with said loop and external to said network, responsive to said current changes for varying the electrical constants of said impedance so as to minimize the effect of said changes, and means whereby said element varies said constants of said impedance.

2. As steps in a method of determining the required characteristics of an anti-sidetone circuit for a subscriber's telephone set, said set comprising a telephone transmitter and a telephone receiver, said set having terminals to which an anti-sidetone circuit is ordinarily connected and having a variable resistance, a variable inductance and a variable capacitance connected to said terminals, to simulate said anti-sidetone circuit, and, coupled to said transmitter, means for impressing thereon a plurality of tones of differing fixed frequencies, covering the range of operation of said set, said set connectable through a large number of interconnections of differing impedances in a typical telephone system: 1, transmitting each of said plurality of tones in turn; 2, balancing out the sidetone for each tone transmitted; 3, scaling off the magnitude of the resistance against the magnitude of the reactance required for each of said balancings on an individual rectilinear graph for each different tone frequency; 4, repeating said transmitting, balancing and plotting for a sufficient number of connections to typify the system.

3. As steps in a method of designing an anti-sidetone circuit for a subscriber's telephone set by means of an anti-sidetone measuring circuit constituting a variable impedance and a source of a plurality of transmitter tones of differing single frequencies within the voice range, and of fixed intensity, said set comprising a telephone transmitter and a telephone receiver, said set interconnectable in a telephone switching system comprising a diversity of telephone loops, lines and switching facilities, said measuring circuit connected to said set to simulate an anti-sidetone circuit: 1, establishing a plurality of individual connections of said set at successive times through facilities representative of said loops, lines and switching facilities, to typify said system; 2, transmitting from said set at different times individual ones of a number of said tones to cover the frequency range of operation of said set for each of said connections; 3, balancing out the sidetone for each of said transmitted tones for each of said connections by adjusting said variable impedance; 4, scaling off the magnitude of the resistive component against the magnitude of the reactive component of the impedance required for balancing on each connection on a separate graph for each frequency.

4. As preliminary steps in the method of designing an anti-sidetone circuit for a subscriber's telephone set, said set comprising a telephone transmitter and a telephone receiver, said set for use in a telephone switching system having a wide diversity of line, link or cord, and trunk facilities interconnectable between pairs of said sets at different times for communication, to determine the required characteristics of an anti-sidetone circuit which is satisfactory notwithstanding said diversity, said set having connectable to said receiver a variable resistance and a variable reactance, to simulate an anti-sidetone circuit, said set having connectable to said transmitter a source of tones of fixed intensity and of frequency variable in steps throughout the designed frequency range of operation of said set: 1, interconnecting successively a sufficient number of individual connections to typify said diversified system; 2, transmitting successively for each of said connections a number of said tones to cover said frequency range; 3, varying the magnitude of the resistive and reactive components required to balance out the sidetone for each impressed tone for each connection; 4, plotting the magnitude of the resistive component against the magnitude of the reactive component for the various connections on a graph for each frequency.

5. In combination in a subscriber's telephone set, a telephone transmitter, a telephone receiver, a transmission equalizer comprising a first variable resistance, said first resistance a heating element in series with said transmitter, a second variable resistance, said second resistance a heat responsive variable resistance element in shunt with said receiver, said resistance elements in heat exchange relationship, an anti-sidetone circuit connected to said receiver, said anti-sidetone circuit including a third variable resistance, the magnitude of the resistance of said third resistance varying with changes in frequency, a fourth variable resistance, said fourth resistance a heat responsive resistance in said anti-sidetone circuit, and another heating element in said telephone set for varying the resistance of said fourth resistance.

6. In combination in a subscriber's telephone set, a transmitter, a receiver, a transmission equalizer connected to said transmitter and receiver to compensate for variations in the characteristics of differing telephone paths connected to said set at differing times, an anti-sidetone circuit connected to said receiver and an inductance coil having appreciable resistance in said anti-sidetone circuit, said coil having a short-circuited turn, said coil effectively constituting a resistance varying with changes in frequency due to eddy currents varying with frequency in said short-circuited turn.

FRANK H. GRAHAM.

REFERENCES CITED

The following references are of record in the file of this patent:

UNITED STATES PATENTS

| Number | Name | Date |
| --- | --- | --- |
| 2,287,998 | Johnson | June 30, 1942 |
| 2,288,049 | Tillman | June 30, 1942 |
| 2,387,269 | Johnson | Oct. 23, 1945 |
| 2,431,306 | Chatterjea | Nov. 25, 1947 |